(12) United States Patent
Kitaoka et al.

(10) Patent No.: US 6,361,813 B1
(45) Date of Patent: Mar. 26, 2002

(54) FREEZE-DRIED FOODS AND PROCESS FOR PRODUCING THE SAME

(75) Inventors: Nobuyuki Kitaoka; Shinichi Makishima; Mitsuhiro Sakurai, all of Saitama (JP)

(73) Assignee: Meiji Seika Kaisha, Ltd., Tokyo (JP)

(*) Notice: Subject to any disclaimer, the term of this patent is extended or adjusted under 35 U.S.C. 154(b) by 0 days.

(21) Appl. No.: 09/623,471

(22) PCT Filed: Mar. 18, 1999

(86) PCT No.: PCT/JP99/01356

§ 371 Date: Sep. 13, 2000

§ 102(e) Date: Sep. 13, 2000

(87) PCT Pub. No.: WO99/48388

PCT Pub. Date: Sep. 30, 1999

(30) Foreign Application Priority Data

Mar. 20, 1999 (JP) .......................................... 10-071927

(51) Int. Cl.⁷ .............................. A23L 1/00; A23L 3/44; A23L 1/035; A23D 9/00; A23G 1/00

(52) U.S. Cl. ........................ 426/384; 426/385; 426/512; 426/444

(58) Field of Search ................................. 426/384, 385, 426/512, 444

(56) References Cited

FOREIGN PATENT DOCUMENTS

| JP | 58170441 | * 10/1983 |
| JP | 8214780 | * 8/1996 |
| JP | 63301759 | * 8/1996 |

* cited by examiner

*Primary Examiner*—Anthony J. Weier
(74) *Attorney, Agent, or Firm*—Rader, Fishman & Grauer, PLLC

(57) ABSTRACT

There are described freeze-dried food products which have porous structure with fine texture than those obtained by conventional processes to give smooth melting in mouth and a process for preparing the freeze-dried food products. According to the process, raw materials for the food are made into a form of aqueous solution or paste, emulsified, made into semi-frozen state by cooling the emulsion, freeze-dried by further cooling in a mold, and then subjected to freeze-drying treatment.

4 Claims, No Drawings

FREEZE-DRIED FOODS AND PROCESS FOR PRODUCING THE SAME

TECHNICAL FIELD

The present invention relates to freeze-dried food products showing smooth melting in mouth and a process for preparing the same.

BACKGROUND ART

As foods freeze-dried and eaten as it were, there are ice creams, freeze-dried fruits and the like, and a process for preparing the same has been disclosed, for instance, in Japanese Patents. 47-19011 (B) and 1-218554(A). These freeze-dried food products have low moisture content and porous structure, since the products have been prepared by freezing moisture or water contained in raw materials thereof and removing the moisture by sublimation, so that parts wherein frozen water presented become vacant spaces. Therefore, the conventional freeze-dried food products give a fragile feeling, which like of snack confectioneries.

However, the freeze-dried food products obtained by simple freeze-drying the raw materials for the food in accordance with the conventional process may give some rough feeling, when it melts in mouth, provides foreign feeling by absorbing saliva in mouth or adheres on mucous membrane in oral cavity, and thus it cannot be said as the food showing smooth melting in mouth.

DISCLOSURE IF INVENTION

Objects of the invention, therefore, are to provide freeze-dried food products showing smooth melting in mouth and a process for preparing the food products.

The process according to the invention comprises steps of dissolving in water raw materials for the food or making the same into a form of paste through a micronizing treatment; emulsifying the food materials in the form of solution or paste by adding thereto heated oil or fat for the food and an emulsifier to mix the same for preparing an emulsion; while stirring the emulsion, cooling the same to prepare semi-frozen cream-like product; distributing the semi-frozen product into a mold; further cooling the product to cause solidification due to freezing; and freeze-drying the frozen solid product.

The freeze-dried food products according to the invention is characterized by those obtained by the above process and show smooth melting in mouth.

In more concrete explanation of the process according to the invention, water-soluble food materials are made into an aqueous solution, or food materials insoluble to water or difficult to dissolve in water are micronizingly processed to make it in the form of paste; the solution or paste is mixed with the oil or fat heated at temperature of 35–70° C. and an emulsifier, by if necessary adding water to adjust water content of the mixture to 30–70% by weight; the emulsion is cooled until temperature becomes –1--6° C., while stirring the same, to obtain semi-frozen cream-like product; the creamy product is distributed into molds or vessels to stand for overnight at temperature of –40--20° C. to cause complete solidification due to freezing; and then the frozen product is freeze-dried to prepare final food products having moisture content of about 4% or more less.

When the food materials are made into the solution or paste, an emulsifier may be added and if necessary, heated to 35–70° C.

When the food materials in the form of solution or paste is prepared or such food materials are mixed with the liquified fat and emulsifier, starch hydrolysate, lactose, sugar, dextrose, sorbitol, maltitol, polydextrose or the like may be added.

There is no specific limitation on the food materials and thus the invention can be applied for an ice cream, cow's milk, yogurt, cheese and the like milk products, chocolate, cookie and the like confectioneries, nuts, fruits, vegetables and others. The term of "chocolate" includes general one to be prepared by mixing cacao mass, cocoa, cocoa butter, sweetening material, powdered milk and the like, rolling and conting treatment as well as analogous products thereof.

When the food material is chocolate and its thermostability is required as the freeze-dried final food product, it is preferable to add a gelatinizing agent such as crystalline cellulose into the emulsion in an amount not exceeding 6% by weight, for instance 2–3% by weight to total solid amount.

As the oil or fat for the food to be used in the process according to the invention, palm oil, palm kernel oil, coconut oil, soybean oil, cotton-seed oil, peanut oil, cocoa butter, substitute oil and fat of cocoa butter and milk fat can be exemplarily listed. Among them, it is suitable to use the cocoa butter, substitute oil and fat of cocoa butter, milk fat or any combination thereof.

Such oil or fat for the food is composed in an amount of 10–80 (W/W) % and more preferably 30–60 (W/W) % to the weight of solid amount of the freeze-dried food product.

The freeze-dried food product obtained by the process according to the invention has porous structure with fine texture, in comparison with products obtained by conventional freeze drying processes and thus is excellent in smooth melting in mouth.

BEST MODES FOR CARRYING OUT THE INVENTION

Now, the invention shall be explained in more detail and concretely with reference to Examples and Test Examples.

EXAMPLE 1

Freeze-dried Sweeten Yogurt

| Raw material | Composing ratio (W/W) % |
| --- | --- |
| Yogurt | 38.67 |
| Starch hydrolysate | 9.84 |
| Lactose | 4.82 |
| Emulsifier | 0.60 |
| Substitute fat of cocoa butter | 12.20 |
| Water | 33.87 |
| Total | 100.00 |

Among the raw materials, yogurt, starch hydrolysate, lactose and emulsifier were dissolved in water to prepare yogurt solution and its temperature was adjusted to 50° C. While, the substitute fat of cocoa butter having solid fat content (SFC) of 85% (15° C.), 80% (20° C.), 72% (25° C.), 19% (30° C.) and 0% (35° C) was heated to prepare liquefied fat and its temperature was adjusted to 50° C.

The temperature adjusted yogurt solution and substitute fat of cocoa butter were poured into a container to stir for 3 minutes by a stirring type homogenizer at 17,500r.p.m. for obtaining an emulsion. The emulsion was cooled to –1--6° C., while stirring the same, to make it in semi-frozen state and then distributed into pantamolds to stand for overnight under temperature condition of −40−−20 ° C. for obtaining frozen solids.

The resulting frozen solids were freeze-dried under conditions of that temperature of the solids was −40−−20° C., temperature of heat-source was set to 20° C. and degree of vacuum was set to 0.2–0.02 Torr, to obtain freeze-dried sweeten yogurt products.

The yogurt products were sampled to show very smooth melting in mouth.

TEST EXAMPLE 1

Effect of Fat Composing Amount

Freeze-dried sweeten yogurt products were prepared by the process as described in Example 1, excepting that ratio of substitute cocoa butter fat to solid content of the final product was varied in a range of 0–80 (W/W) %, to evaluate melting in mouth and taste of each product.

Results are shown in following Table 1 which shows that the products with the ratio of substitute fat of cocoa butter lies in a range of 10–80 (W/W) % show smooth melting in mouth, products with the ratio of 30–60 (W/W) % show smooth melting in mouth similar to chocolate and do not spoil taste as the yogurt, and product with the ratio of 80 (W/W) % spoils taste as the yogurt.

TABLE 1

| Composition | Fat ratio (W/W) % | State of melting in mouse or taste |
|---|---|---|
| 1 | 0 | Product shows rough feeling and no smooth melting in mouth |
| 2 | 10 | Rough feeling disappears and melting in mouth becomes smooth |
| 3 | 30 | Product shows smooth melting in mouth |
| 4 | 45 | Product shows smooth melting in mouth |
| 5 | 60 | Product shows smooth melting in mouth |
| 6 | 80 | Product shows smooth melting in mouth, but is not sufficient in taste as yogurt |

EXAMPLE 2

Freeze-dried Ice Cream

| Raw material | Composing ratio (W/W) % |
|---|---|
| Commercially available ice cream | 55.38 |
| Substitute fat of cocoa butter | 10.57 |
| Emulsifier | 0.60 |
| Water | 33.45 |
| Total | 100.00 |

Among the raw materials, the commercially available ice cream and emulsifier were dissolved in water to prepare a solution containing the milk product and sugar. While, the substitute fat of cocoa butter was heated to 50° C. to prepare liquefied substitute fat of cocoa butter.

The milk product-sugar solution and liquefied substitute fat of cocoa butter were poured into a container and stirred for 3 minutes by using a stirring type homogenizer at 17,500r.p.m. to obtain an emulsion. The emulsion was cooled to −1−−6° C., while stirring the same to make it semi-frozen creamy state and distributes into pantamolds to stand for overnight at temperature of −40−−20° C. to obtain frozen solids.

The resulting frozen products were freeze-dried under conditions of that temperature of the products was −40−−20° C., temperature of heat-as source set to 20° C., and degree of vacuum was set to 0.2=0.02 Torr, tp prepare freeze-dried ice cream products.

The resulting freeze-dried ice cream products were sampled to show very smooth melting in mouth.

EXAMPLE 3

Freeze-dried Cookie

| Raw material | Composing amount (W/W) % |
|---|---|
| Cookie | 19.43 |
| Emulsifier | 0.60 |
| Substitute fat of cocoa butter | 10.70 |
| Water | 69.27 |
| Total | 100.00 |

The cookie was pulverized by a grinder, a part of the substitute fat of cocoa butter was added to the pulverized cookie, so that oil content thereof becomes in a range of 26–28%, to mix the same, and then treated by a refiner to prepare a crumb paste.

The crumb paste, remaining substitute cocoa butter fat liquefied by heating to 50° C., emulsifier and water were poured into a container and heated to 50° C. to prepare liquefied raw material which was stirred by using a stirring type homogenizer for 3 minutes at 17,500r.p.m. to obtain an emulsion.

The emulsion was cooled to −1−−6° C. to make it semi-frozen creamy state and distributes into pantamolds to stand for one overnight at temperature of −40−−20° C. to obtain frozen solids.

The resulting frozen products were freeze-dried under conditions of that temperature of the products was −40−−20° C., temperature of heat-source was set to 20° C., and degree of vacuum was set to 0.2–0.02 Torr, to prepare freeze-dried cookie products.

The resulting freeze-dried cookie products were sampled to show very smooth melting in mouth.

EXAMPLE 4

Freeze-dried Almond Product

| Raw material | Composing amount (W/W) % |
|---|---|
| Almond paste | 13.84 |
| Starch hydrolysate | 12.60 |
| Emulsifier | 0.60 |
| Substitute fat of cocoa butter | 7.50 |
| Water | 65.46 |
| Total | 100.00 |

Almond nuts were ground by a grinder and treated by a refiner to prepare almond paste.

The almond paste, substitute fat of cocoa butter liquefied by heating to 50° C., starch hydrolysate, emulsifier and water were poured into a container and heated to 50° C. to prepare liquefied raw material which was stirred by using a stirring type homogenizer for 3 minutes at 17,500r.p.m. to obtain an emulsion.

The emulsion was cooled to −1—−6° C. to make it semi-frozen creamy state and distributes into pantamolds to stand for overnight at temperature of −40—−20° C. to obtain frozen solids.

The resulting frozen products were freeze-dried under conditions of that temperature of the products was −40—−20° C/, temperature of heat-source was set to 20° C., and degree of vacuum was set to 0.2–0.02 Torr, to prepare freeze-dried almond food products.

The freeze-dried almond products were sampled to show very smooth melting in mouth.

EXAMPLE 5

Freeze-dried Chocolate No. 1

| Raw material | Composing amount (W/W) % |
|---|---|
| Chocolate | 12.00 |
| Cocoa butter | 17.40 |
| Emulsifier | 0.60 |
| Water | 70.00 |
| Total | 100.00 |

The chocolate and cocoa butter were liquefied by heating to 50° C., and the emulsifier was dissolved in water to prepare an emulsifying solution. The liquefied solutions were mixed and stirred for 3 minutes by a homogenizer at 17,500r.p.m. to obtain an emulsion.

The emulsion was cooled to −1—−6° C., while stirring the same, to make it semi-frozen creamy state and distributed into pantamolds to stand for overnight at temperature of −40/−−20° C. to obtain frozen solids.

The resulting frozen products were freeze-dried under conditions of that temperature of the products was −40—−20° C., temperature of heat-source was set to 20° C., and degree of vacuum was set to 0.2–0.02 Torr, to prepare freeze-dried chocolate products.

The freeze-dried chocolate products were sampled to show a fragile feeling, which like of snack confectioneries and very smooth melting in mouth.

EXAMPLE 6

Freeze-dried Chocolate No. 2

| Raw material | Composing amount (W/W) % |
|---|---|
| Chocolate | 12.00 |
| Cocoa butter | 17.40 |
| Emulsifier | 0.60 |
| Crystalline cellulose | 0.30 |
| Water | 69.70 |
| Total | 100.00 |

Freeze-dried chocolate products were prepared by using said raw materials and the process similar to that as described in Example 5.

The freeze-dried chocolate products were also sampled to show a fragile feeling, which like of snack confectioneries and very smooth melting in mouth.

TEST EXAMPLE 2

Thermostability Test

Thermostability of the freeze-dried chocolate products obtained by Examples 5 and 6 as well as a commercially available chocolate ("Milk chocolate" marketed by Meiji Seika Kaisha, Ltd.) was evaluated by standing the same for 24 hours under each temperature condition of 20, 30, 35, 45, 55 and 67° C.

Results are shown in following Table 2 which shows facts that the freeze-dried chocolate products according to the invention is quite excellent in thermostability than commercially available chocolate and that the thermostablity increases by composing crystalline cellulose therein.

TABLE 2

| Temperature (° C.) | Example 5 | Example 6 | Commercially available chocolate |
|---|---|---|---|
| 20 | ○ | ○ | ○ |
| 30 | ○ | ○ | Δ |
| 35 | ○ | ○ | x |
| 45 | ○ | ○ | x |
| 55 | Δ | ○ | x |
| 67 | Δ | Δ | x |

In Table 2,
○: No problem as the commercial product,
Δ: Product keeps its form, but there is some problem as the commercial product, since oily stain generates, after packing thereof, and
x: Product does keep its form

Industrial Applicability

According to the process of invention, food raw materials are made into a form of solution or paste, emulsified, made into semi-frozen state by cooling the emulsion and then made into frozen solid state by further cooling the semi-frozen material, prior to final freeze-drying treatment. As a result, the freeze-dried product has porous structure with fine texture in comparison with freeze-dried product obtained by a conventional process. Therefore, the product shows smooth melting in mouth and is excellent in liking.

What is claimed is:

1. A process for preparing a freeze-dried food product, which comprises steps of dissolving food materials in water or making food materials into a form of paste through a micronizing treatment; emulsifying the food materials in the form of solution or paste by adding heated oil or fat and an emulsifier; while stirring the emulsion, cooling the emulsion so as to prepare semi-frozen, creamy product; distributing the semi-frozen product into a mold; further cooling the product so as to form a frozen, solid product; and freeze-drying the frozen, solid product.

2. A process as claimed in claim 1, wherein said oil or fat is palm oil, palm kernel oil, coconut oil, soybean oil, cotton-seed oil, peanut oil, cocoa butter, substitute fat of cocoa butter, substitute oil of cocoa butter, milk fat, or mixtures thereof.

3. A process as claimed in claim 1 or 2, wherein content of said oil or fat is 10–80 (W/W) % to the weight of solid in said freeze-dried food product.

4. A process as claimed in claim 1, wherein the emulsion is cooled to a temperature within the range of −1° to −6° C. in the step of stirring and cooling the emulsion so as to prepare the semi-frozen, creamy product.

* * * * *

UNITED STATES PATENT AND TRADEMARK OFFICE
CERTIFICATE OF CORRECTION

PATENT NO.     : 6,361,813 B1
DATED          : March 26, 2002
INVENTOR(S)    : Nobuyuki Kitaoka et al.

It is certified that error appears in the above-identified patent and that said Letters Patent is hereby corrected as shown below:

<u>Title page,</u>
The Foreign Application Priority Data (30) should read:
Mar. 20, 1998 (JP) ………………. 10-071927

Signed and Sealed this

Fourth Day of June, 2002

Attest:

Attesting Officer

JAMES E. ROGAN
*Director of the United States Patent and Trademark Office*